(12) United States Patent

Chen et al.

(10) Patent No.: US 11,089,587 B2
(45) Date of Patent: Aug. 10, 2021

(54) PHYSICAL UPLINK SHARED CHANNEL TRANSMISSION METHOD AND TERMINAL DEVICE

(71) Applicant: GUANGDONG OPPO MOBILE TELECOMMUNICATIONS CORP., LTD., Dongguan (CN)

(72) Inventors: Wenhong Chen, Dongguan (CN); Zhihua Shi, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/933,426

(22) Filed: Jul. 20, 2020

(65) Prior Publication Data

US 2020/0351850 A1 Nov. 5, 2020

Related U.S. Application Data

(63) Continuation of application No. PCT/CN2018/076874, filed on Feb. 14, 2018.

(51) Int. Cl.
*H04W 72/04* (2009.01)

(52) U.S. Cl.
CPC ....... *H04W 72/042* (2013.01); *H04W 72/046* (2013.01); *H04W 72/0413* (2013.01)

(58) Field of Classification Search
CPC ... H04W 72/0406–042; H04W 72/046; H04W 72/1289; H04B 7/0408; H04B 7/0695; H04B 7/088
See application file for complete search history.

(56) References Cited

U.S. PATENT DOCUMENTS

2011/0205988 A1  8/2011  Zhang et al.
2017/0208584 A1  7/2017  Qu et al.
(Continued)

FOREIGN PATENT DOCUMENTS

CN  101478824 A  7/2009
CN  102035631 A  4/2011
(Continued)

OTHER PUBLICATIONS

Guangdong OPPO Mobile Telecommunications Corp. Ltd., International Search Report and Written Opinion, PCT/CN2018/076874, dated Nov. 12, 2018, 8 pgs.
(Continued)

*Primary Examiner* — Pao Sinkantarakorn
(74) *Attorney, Agent, or Firm* — Morgan, Lewis & Bockius LLP

(57) ABSTRACT

Provided in the embodiments of the present application are a physical uplink shared channel transmission method and a terminal device. With said method, when a terminal does not carry out uplink beam management before being scheduled to transmit a PUSCH and is thus unable to determine an uplink beam, a transmission beam for transmitting the PUSCH may be determined, and the PUSCH may thus be transmitted according to the determined beam, thereby improving the PUSCH transmission performance. The method comprises: a terminal device determines a transmission beam for transmitting a first PUSCH according to a beam used to receive a PDCCH, a beam used to transmit a PUSCH previously or a beam used to transmit a PUCCH; and the terminal device transmits the first PUSCH according to the determined beam.

5 Claims, 2 Drawing Sheets

(56) References Cited

U.S. PATENT DOCUMENTS

2019/0141693 A1* 5/2019 Guo .................. H04B 7/00
2019/0174466 A1* 6/2019 Zhang ................ H04L 5/005
2020/0059951 A1* 2/2020 Frenne ............. H04L 5/0023
2020/0187168 A1* 6/2020 Liu .................. H04L 1/0061

FOREIGN PATENT DOCUMENTS

| CN | 104380625 A | 2/2015 |
| CN | 107637000 A | 1/2018 |
| CN | 110120862 A | 8/2019 |
| CN | 110149189 A | 8/2019 |

OTHER PUBLICATIONS

OPPO, "Discussion on Remaining Issues of Beam Management," 3GPP TSG RAN WG1 Meeting 91, R1-1719987, Reno, USA, Nov. 27-Dec. 1, 2017, 7 pgs.

CATT, "Remaining details on beam management," 3GPP TSG RAN WG1 Meeting 91, R1-1720182, Reno, USA, Nov. 27-Dec. 1, 2017, 11 pgs.

Ericsson: Performance of beam management without beam indication, 3GPP TSG-RAN WG1 Meeting #88bis, R1-1705894, Spokane, U.S. Apr. 3-7, 2017, 8 pgs.

Guangdong OPPO Mobile Telecommunications Corp. Ltd., Extended European Search Rpt, EP18906345.6, dated Nov. 27, 2020, 10 pgs.

Guangdong OPPO Mobile Telecommunications Corp. Ltd., First Office Action, CN202010088946.3, dated Nov. 3, 2020, 17 pgs.

* cited by examiner

200

S210 — A terminal determines a transmission beam for transmitting a first PUSCH according to a beam used to receive a PDCCH, a beam used to transmit a PUSCH previously or a beam used to transmit a PUCCH S220 — The terminal device transmits the first PUSCH according to the determined beam Terminal device 300

Processing unit 310

Communication unit 320

PHYSICAL UPLINK SHARED CHANNEL TRANSMISSION METHOD AND TERMINAL DEVICE

CROSS-REFERENCE TO RELATED APPLICATION

This application is a continuation of PCT Application No. PCT/CN2018/076874, filed Feb. 14, 2018, the entire contents of which are incorporated herein by reference.

TECHNICAL FIELD

The present application relates to the field of communications, and more particularly, to a method for transmitting a physical uplink shared channel and a terminal device.

BACKGROUND

In the 5-Generation New Radio (5G NR), a network device may use two types of Downlink Control Information (DCI) formats (for example, DCI format 0_0 and DCI format 0_1) to schedule a Physical Uplink Shared Channel (PUSCH) transmission. However, when the network device transmits the PUSCH by scheduling the third message (Message 3, MSG.3) in a contention-based random access process through DCI format 0_0, or transmits the PUSCH by an uplink single antenna port, before sending the PUSCH scheduled by the DCI, the terminal device may not send a sounding reference signal (SRS), and may not perform an uplink beam management (for determining the uplink transmitting beam). At this time, the terminal device cannot determine the beam for transmitting the PUSCH.

SUMMARY

The embodiments of the present application provide a method for transmitting a physical uplink shared channel and a terminal device. When the terminal cannot perform uplink beam management and cannot determine an uplink beam before being scheduled to transmit a PUSCH, it can determine a beam for transmitting the PUSCH, then the PUSCH can be transmitted according to the determined beam, thereby improving the performance of the PUSCH transmission.

In a first aspect, an embodiment of the present application provides a method for transmitting a physical uplink shared channel, including:

determining, by a terminal device, a beam for transmitting a first physical uplink shared channel (PUSCH) according to a beam used for receiving a physical downlink control channel (PDCCH), or a beam used for a previously sent PUSCH, or a beam used for sending a physical uplink control channel (PUCCH); and transmitting, by the terminal device, the first PUSCH according to the determined beam.

Therefore, in the method for transmitting a physical uplink shared channel in the embodiments of the present application, the terminal device determines the sanding beam for transmitting the first PUSCH according to the beam used for receiving the PDCCH, or the beam used for a previously sent PUSCH, or a beam used for transmitting a PUCCH, so that the first PUSCH can be transmitted according to the determined beam, thereby improving the performance of PUSCH transmission.

Optionally, in an implementation manner of the first aspect, before determining, by the terminal device, the beam for transmitting the first PUSCH, the method further includes:

receiving, by the terminal device, downlink control information (DCI) sent by a network device, the DCI being used to schedule transmission of the first PUSCH.

Optionally, in an implementation manner of the first aspect, a DCI format of the DCI is DCI format 0_0.

Optionally, in an implementation manner of the first aspect, the DCI does not include Sounding Reference Signal Resource Indicator (SRI) information, and the SRI information is used to indicate at least one SRS resource.

Optionally, in an implementation manner of the first aspect, the transmission of the first PUSCH is based on a single antenna port.

Optionally, in an implementation manner of the first aspect, the first PUSCH is used to carry a MSG.3 in a contention-based random access process.

Optionally, in an implementation manner of the first aspect, the PDCCH is a PDCCH carrying a DCI for scheduling the first PUSCH, or the PDCCH is a PDCCH satisfying a predefined latency relationship with the first PUSCH.

Optionally, in an implementation manner of the first aspect, the PDCCH is the PDCCH satisfying the predefined latency relationship with the first PUSCH, including:

the PDCCH is a recently received PDCCH which is k slots or k OFDM symbols before the terminal device transmits the first PUSCH, k being a non-negative integer.

Optionally, in an implementation manner of the first aspect, the determining, by the terminal device, the beam for transmitting the first PUSCH according to the beam used for receiving the PDCCH, includes:

determining, by the terminal device, a receiving beam used for receiving the PDCCH, or a receiving beam used for receiving a control resource set (CORESET) where the PDCCH is located, as the beam for transmitting the first PUSCH.

Optionally, in an implementation manner of the first aspect, when a beam correspondence for the terminal device is established, the determining, by the terminal device, the beam for transmitting the first PUSCH according to the beam used for receiving the PDCCH, includes:

determining, by the terminal device, a receiving beam used for receiving the PDCCH as the beam for transmitting the first PUSCH.

Optionally, in an implementation manner of the first aspect, the determining, by the terminal device, the beam for transmitting the first PUSCH according to the beam used for the previously sent PUSCH, includes:

determining, by the terminal device, a beam used for sending a MSG.3 in a contention-based random access process, or a beam used for sending the PUSCH last time, as the beam for transmitting the first PUSCH.

Optionally, in an implementation manner of the first aspect, when a beam correspondence for the terminal device is not established, the determining, by the terminal device, the beam for transmitting the first PUSCH according to the beam used by the previously sent PUSCH, includes:

determining, by the terminal device, the beam used by the previously sent PUSCH as the beam for transmitting the first PUSCH.

Optionally, in an implementation manner of the first aspect, the determining, by the terminal device, the beam for transmitting the first PUSCH according to the beam used for sending the PUCCH includes:

receiving, by the terminal device, PUCCH spatial information indicated by a network device through radio resource control (RRC) signaling and/or media access control (MAC) signaling; and determining, by the terminal device, the beam for transmitting the first PUSCH according to the PUCCH spatial information.

Optionally, in an implementation manner of the first aspect, when a beam correspondence for the terminal device is not established, the determining, by the terminal device, the beam for transmitting the first PUSCH according to the beam used for sending the PUCCH, includes:

determining, by the terminal device, the beam used for sending the PUCCH as the beam for transmitting the first PUSCH.

In a second aspect, the embodiments of the present application provide a terminal device, which may execute the module or unit of the method in the first aspect or any optional implementation manner of the first aspect.

In a third aspect, there is provided a terminal device. The terminal device includes a processor, a memory, and a communication interface. The processor is connected to the memory and communication interface. The memory is configured to store instructions, the processor is configured to execute the instructions, and the communication interface is configured to communicate with other network elements under the control of the processor. When the processor executes the instructions stored in the memory, the execution causes the processor to execute the method in the first aspect or any possible implementation manner of the first aspect.

According to a fourth aspect, there is provided a computer storage medium. The computer storage medium stores program code, where the program code is used to instruct a computer to execute instructions of the methods described in the foregoing aspects.

In a fifth aspect, there is provided a computer program product including instructions that, when run on a computer, cause a computer to perform the methods described in the above aspects.

DETAILED DESCRIPTION

The technical solutions in the embodiments of the present application will be clearly and completely described below with reference to the accompanying drawings in the embodiments of the present application.

The technical solutions in the embodiments of the present application may be applied to a 5G NR communication system.

The terminal device in the embodiments of the present application may refer to User Equipment (UE), an access terminal, a user unit, a user station, a mobile station, a mobile platform, a remote station, a remote terminal, a mobile device, a user terminal, a terminal, a wireless communication device, a user agent or a user apparatus. The access terminal may be a cell phone, a cordless phone, a Session Initiation Protocol (SIP) phone, a Wireless Local Loop (WLL) station, a Personal Digital Assistant (PDA), a handheld device having a wireless communication function, a computing device or other processing device connected to a wireless modem, a vehicle-mounted device, a wearable device, a terminal device in 5G network or a terminal device in future evolved Public Land Mobile Network (PLMN) and the like, which are not limited in the embodiments of the present application.

The present application describes various embodiments in conjunction with a network device. The network device in the embodiments of the present application may be a device configured to communicate with a terminal device. The network device may be an Evolutional NodeB (eNB or eNodeB) in an LTE system, or a radio controller in a Cloud Radio Access Network (CRAN) scenario, or the network device may be a relay station, an access point, an in-vehicle device, a wearable device, a Next Generation Evolutional NodeB (NG-eNB), and an access network device in 5G network (for example, gNB) or an access network device in a future evolutional Public Land Mobile Network (PLMN) network, which is not limited in the embodiments of the present application.

Figures 1, 2, 3:
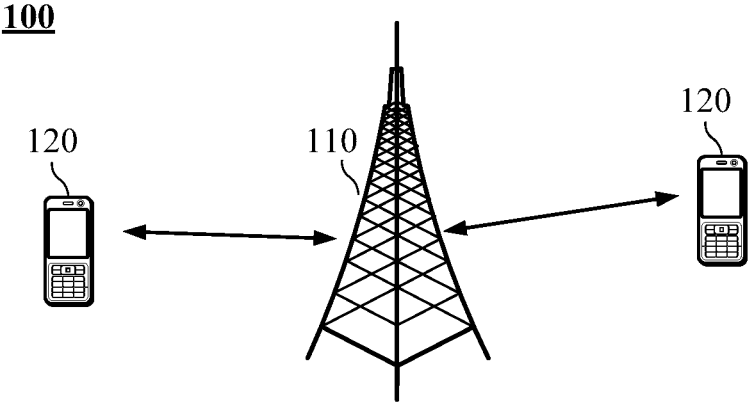
FIG. 1 is a schematic diagram of an application scenario according to an embodiment of the present application.
FIG. 2 is a schematic flowchart of a method for transmitting a physical uplink shared channel according to an embodiment of the present application.
FIG. 3 is a schematic block diagram of a terminal device according to an embodiment of the present application.

FIG. 1 exemplarily shows one network device and two terminal devices. Optionally, the wireless communication system 100 may include a plurality of network devices and the coverage of each network device may include other numbers of terminal devices, which is not limited by the embodiments of the present application.

Optionally, the wireless communication system 100 may further include an Access and Mobility Management Function (AMF), a Session Management Function (SMF), a Unified Data Management (UDM), an Authentication Server Function (AUSF) and other network entities, which is not limited in the embodiments of the present application.

In addition, various aspects or features of the present application may be implemented as a method, an apparatus, or a product using standard programming and/or engineering techniques. The term "product" as used in the present application encompasses a computer program accessible from any computer-readable device, carrier, or medium. For example, the computer-readable media may include, but are not limited to: a magnetic storage device (e.g., a hard disk, a floppy disk, or a magnetic tape, etc.), an optical disk (e.g., a Compact Disc (CD), a Digital Versatile Disc (DVD), etc.), a smart card and a flash memory device (for example, an Erasable Programmable Read-Only Memory (EPROM), a card, a stick or a key drive, etc.). In addition, the various storage media described herein may represent one or more devices and/or other machine-readable media used to store information. The term "machine-readable medium" may include, but is not limited to, various media capable of storing, containing, and/or carrying instruction(s) and/or data.

It should be understood that the terms "system" and "network" are often used interchangeably herein. The term "and/or" herein is only a kind of association relationship describing related objects, which means that there may be three kinds of relationships, for example, A and/or B may mean the following three relationships: A exists alone, A and B exist simultaneously, and B exists alone. In addition, the character "/" herein generally indicates that the related objects are in an "or" relationship.

FIG. 2 is a schematic flowchart of a method for transmitting a physical uplink shared channel 200 according to an embodiment of the present application. The method 200 may optionally be applied to the system shown in FIG. 1, but is not limited thereto. The method 200 includes at least part of the following content.

In S210, the terminal device determines a beam for transmitting a first PUSCH according to a beam used for receiving a PDCCH, or a beam used for a previously sent PUSCH, or a beam used for transmitting a PUCCH.

Optionally, in the embodiments of the present application, before the terminal device is scheduled to transmit the first PUSCH, it cannot determine the uplink beam because it does not perform the uplink beam management.

It should be understood that, in the embodiments of the present disclosure, a beam used for receiving a signal may also be described as a spatial domain reception filter used for receiving a signal, and a beam used for sending a signal may also be described as a spatial domain transmission filter used for sending a signal. If two signals use the same spatial domain transmission filter to send the signals, then these two signals may be called as being quasi-co-located for the spatial receiving parameter.

Optionally, before the terminal device determines the beam for transmitting the first PUSCH, the method 200 further includes:

receiving, by the terminal device, a DCI sent by a network device, the DCI being used to schedule transmission of the first PUSCH.

Optionally, the DCI format of the DCI is DCI format 0_0.

Specifically, the DCI format 0_0 is used to schedule PUSCH transmission in a fallback mode.

Optionally, the DCI does not include SRI information, and the SRI information is used to indicate at least one SRS resource.

Specifically, the terminal device may determine a precoding matrix and/or a beam used for PUSCH transmission according to the at least one SRS resource indicated by the SRI information. If the DCI does not contain an indication field of the SRI information, the terminal device cannot determine the uplink transmitting beam from the information carried by the DCI.

Optionally, the transmission of the first PUSCH is based on a single antenna port.

It should be understood that the single antenna port may be a port for PUSCH transmission, or a Demodulation Reference Signal (DMRS) port.

Specifically, the first PUSCH is transmitted through only one antenna port, and is not transmitted through a plurality of antenna ports.

Optionally, the first PUSCH is used to carry MSG.3 in a contention-based random access process.

Optionally, the PDCCH is a PDCCH carrying a DCI for scheduling the first PUSCH, or the PDCCH is a PDCCH that satisfies a predefined latency relationship with the first PUSCH.

Specifically, the PDCCH is a recently received PDCCH which is k time slots or k OFDM symbols before the terminal device transmits the first PUSCH, and k is a non-negative integer.

The value of k may be a fixed value agreed upon by the terminal device and the network device, and k is an integer greater than or equal to 0. For example, if the first PUSCH is transmitted in the $n^{th}$ time slot, the second PDCCH is the PDCCH recently received by the terminal device before the $(n-k)^{th}$ time slot; and if the value of k is 0, it means that the second PDCCH is the PDCCH recently received before the terminal device transmits the first PUSCH.

The first PUSCH may not be a PUSCH scheduled through DCI, but a PUSCH autonomously sent by the terminal device, for example, a PUSCH based on a grant-free method or a Semi-Persistent Scheduling (SPS)-based PUSCH, or MSG.3 sent based on Radio Access Technology (RAT). At this time, there is no DCI to indicate the beam information, and the terminal can only obtain the beam information from other signals.

Specifically, the terminal device determines a receiving beam used for receiving the PDCCH, or a receiving beam used for receiving a CORESET where the PDCCH is located as the beam for transmitting the first PUSCH.

For example, the terminal device determines the spatial domain reception filter used for receiving the PDCCH, or the spatial domain reception filter used for receiving the CORESET where the PDCCH is located as the beam for transmitting the first PUSCH.

Specifically, if the Beam Correspondence for the terminal device is established, the terminal device determines a receiving beam used for receiving the PDCCH as the beam for transmitting the first PUSCH.

Optionally, the beam correspondence on the terminal side needs to be reported to the network side as a terminal capability. That is, the beam correspondence for the terminal device needs to be reported to the network device as the terminal capability.

Specifically, the terminal device determines the beam used for transmitting MSG.3 in the contention-based random access process, or the beam used for transmitting the PUSCH last time as the beam for transmitting the first PUSCH.

For example, the terminal device determines the spatial domain reception filter used for sending MSG.3 or the recently sent PUSCH as the spatial domain transmission filter for transmitting the first PUSCH.

Specifically, if the beam correspondence for the terminal device is not established, the terminal device determines the beam used by the previously sent PUSCH as the beam for transmitting the first PUSCH.

Specifically, the terminal device receives PUCCH spatial information indicated by the network device through RRC signaling and/or MAC signaling; and the terminal device determines the beam for transmitting the first PUSCH according to the PUCCH spatial information.

For example, the network device configures a plurality of PUCCH spatial information configurations through RRC signaling, and then selects the currently used PUCCH spatial information from the MAC signaling, and determines the beam used for transmitting the first PUSCH according to the PUCCH spatial information. Therefore, the method may also be described as follows: the terminal device determines a spatial transmission filter for transmitting the first PUSCH according to the spatial information or the spatial transmission filter of the PUCCH.

Specifically, if the beam correspondence for the terminal device is not established, the terminal device determines the beam used for sending the PUCCH used as the beam for transmitting the first PUSCH.

Optionally, the beam correspondence on the terminal side needs to be reported to the network side as the terminal capability. That is, the beam correspondence for the terminal device needs to be reported to the network device as the terminal capability.

In S220, the terminal device transmits the first PUSCH according to the determined beam.

That is, the terminal device transmits the first PUSCH according to the determined spatial domain transmission filter.

Therefore, in the method for transmitting a physical uplink shared channel in the embodiments of the present application, when the terminal device cannot determine the uplink beam without performing uplink beam management before being scheduled to transmit the first PUSCH, the terminal device can determine the beam for transmitting the first PUSCH according to the beam used for receiving the PDCCH, or the beam used by the previously sent PUSCH or the beam used for sending the PUCCH, so that the first PUSCH can be transmitted according to the determined beam, thereby improving the performance of the PUSCH transmission.

FIG. 3 is a schematic block diagram of a terminal device 300 according to an embodiment of the present application. The terminal device 300 includes:

a processing unit 310, configured to determine a beam for transmitting a first PUSCH according to a beam used for receiving a PDCCH, or a beam used for a previously sent PUSCH, or a beam used for transmitting a PUCCH; and a communication unit 320, configured to transmit the first PUSCH according to the determined beam.

Optionally, before the processing unit 310 determines to transmit the beam of the first PUSCH, the communication unit 320 is further configured to receive downlink control information (DCI) sent by a network device, where the DCI is used to schedule transmission of the first PUSCH.

Optionally, the DCI format of the DCI is DCI format 0_0.

Optionally, the DCI does not include SRI information, and the SRI information is used to indicate at least one SRS resource.

Optionally, the transmission of the first PUSCH is based on a single antenna port.

Optionally, the first PUSCH is used to carry a third message (MSG.3) in a contention-based random access process.

Optionally, the PDCCH is a PDCCH carrying a DCI for scheduling the first PUSCH, or the PDCCH is a PDCCH that satisfies a predefined latency relationship with the first PUSCH.

Optionally, the PDCCH being a PDCCH that satisfies a predefined latency relationship with the first PUSCH includes:

the PDCCH is a recently received PDCCH which is k time slots or k OFDM symbols before the terminal device transmits the first PUSCH, and k is a non-negative integer.

Optionally, the processing unit 320 is specifically configured to:

determine a receiving beam used for receiving the PDCCH or a receiving beam used for receiving a CORESET where the PDCCH is located as the beam for transmitting the first PUSCH.

Optionally, if a beam correspondence for the terminal device is established, the processing unit 320 is specifically configured to:

determine a receiving beam used for receiving the PDCCH as the beam for transmitting the first PUSCH.

Optionally, the processing unit 320 is specifically configured as:

determine a beam used for transmitting MSG.3 in the contention-based random access process, or a beam used for transmitting the PUSCH last time as the beam for transmitting the first PUSCH.

Optionally, if the beam correspondence for the terminal device is not established, the processing unit 320 is specifically configured to:

determine the beam used by the previously sent PUSCH as the beam for transmitting the first PUSCH.

Optionally, the processing unit 320 is specifically configured to:

receive PUCCH spatial information indicated by the network device through RRC signaling and/or MAC signaling; and determine the beam for transmitting the first PUSCH according to the PUCCH spatial information.

Optionally, if the beam correspondence for the terminal device is not established, the processing unit 320 is specifically configured to:

determine the beam used for transmitting the PUCCH as the beam for transmitting the first PUSCH.

It should be understood that the terminal device 300 may correspond to the terminal device in the method 200, and may implement corresponding operations implemented by the terminal device in the method 200. For brevity, details are not described herein.

Figure 4:
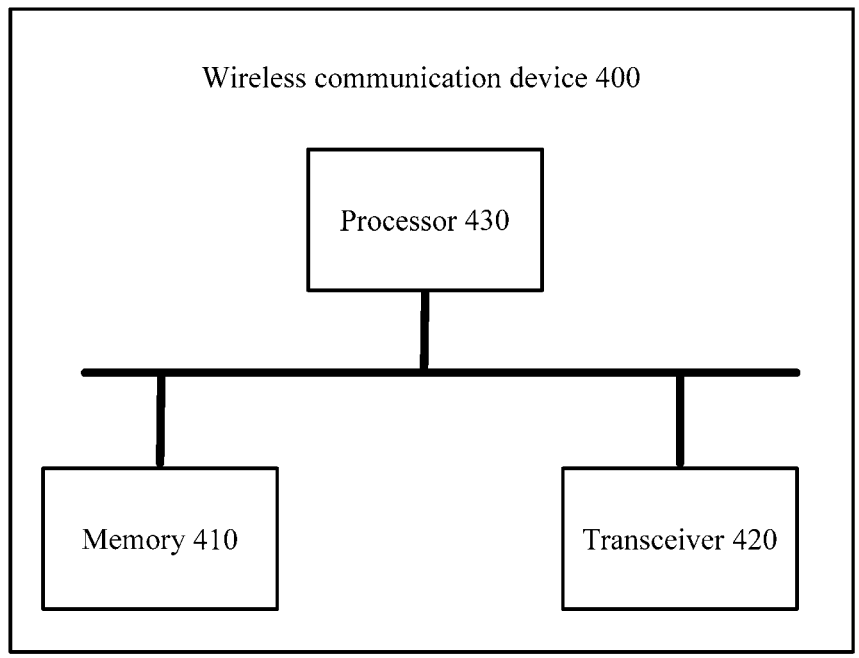
FIG. 4 shows a schematic block diagram of a wireless communication device according to an embodiment of the present application.

FIG. 4 shows a schematic block diagram of a wireless communication device 400 according to an embodiment of the present application. The device 400 includes:

a memory 410, configured to store a program, where the program includes code;

a transceiver 420, configured to communicate with other devices; and a processor 430, configured to execute program code in the memory 410.

Optionally, the transceiver 420 is configured to perform specific signal transceiving under the driving of the processor 430.

Optionally, when the code is executed, the processor 430 may implement various operations performed by the terminal device in the method 200 in FIG. 2. For brevity, details are not described herein again. At this time, the device 400 may be a terminal device, such as a mobile phone.

It should be understood that, in the embodiments of the present application, the processor 430 may be a Central Processing Unit (CPU), and the processor 430 may also be other general-purpose processor, a digital signal processor (DSP), or an application-specific integrated circuit (ASIC), a field programmable gate array (FPGA) or other programmable logic devices, discrete gate or transistor logic devices, discrete hardware components, etc. The general-purpose processor may be a microprocessor or the processor may be any conventional processor or the like.

The memory 410 may include a read-only memory and a random access memory, and provide instructions and data to the processor 430. A part of the memory 410 may further include a non-volatile random access memory. For example, the memory 410 may also store information of a device type.

The transceiver 420 may be configured to implement signal sending and reception functions, such as frequency modulation and demodulation functions or called up-conversion and down-conversion functions.

In the implementation process, at least one step of the above method may be completed by an integrated logic circuit of hardware in the processor 430, or the integrated logic circuit may complete the at least one step under driving of the instruction in a software form. Therefore, the wireless communication device 400 may be a chip or a chipset. The steps of the method disclosed in combination with the embodiments of the present application may be directly implemented by a hardware processor, or may be performed by a combination of hardware and software modules in the processor. The software module may be located in a mature storage medium in the art such as a random access memory, a flash memory, a read-only memory, a programmable read-only memory, or an electrically erasable programmable memory, a register, and the like. The storage medium is located in the memory, and the processor 430 reads information in the memory and completes the steps of the foregoing method in combination with its hardware. To avoid repetition, it will not be described in detail here.

Figure 5:
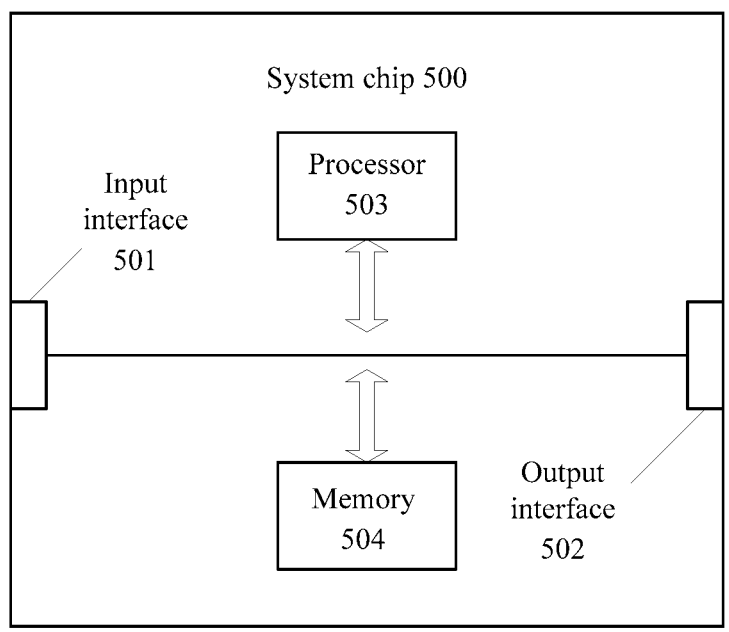
FIG. 5 is a schematic structural diagram of a system chip according to an embodiment of the present application.

FIG. 5 is a schematic structural diagram of a system chip 500 according to an embodiment of the present application. The system chip 500 of FIG. 5 includes an input interface 501, an output interface 502, a processor 503, and a memory 504, which are connected through internal communication lines. The processor 503 is configured to execute code in the memory 504.

Optionally, when the code is executed, the processor 503 implements the method executed by the terminal device in the method embodiment. For brevity, it is not repeated here.

In the above embodiments, it may be implemented in whole or in part by software, hardware, firmware, or any combination thereof. When implemented in software, it may be implemented in whole or in part in the form of a computer program product. The computer program product includes one or more computer instructions. When the computer program instructions are loaded and executed on a computer, the processes or functions according to the embodiments of the present application are wholly or partially generated. The computer may be a general purpose computer, a special purpose computer, a computer network, or other programmable device. The computer instructions may be stored in a computer-readable storage medium or transmitted from one computer-readable storage medium to another computer-readable storage medium, for example, the computer instructions may be transmitted from a website site, a computer, a server, or a data center through a wire (such as a coaxial cable, an optical fiber, a digital subscriber line (DSL)) or a wireless way (such as infrared, wireless, microwave, etc.) to another website site, computer, server, or data center. The computer-readable storage medium may be any available medium that can be accessed by a computer or a data storage device such as a server, a data center, or the like that includes one or more available medium integration. The available medium may be a magnetic medium (for example, a floppy disk, a hard disk, a magnetic tape), an optical medium (for example, a DVD), or a semiconductor medium (for example, a solid state disk (SSD)).

It should be understood that, in the various embodiments of the present application, the size of the sequence numbers of the above processes does not mean the order of execution. The execution order of each process should be determined by its function and internal logic, and should not constitute any limitation on the implementation process of the embodiments of the present application.

Those skilled in the art can clearly understand that, for the convenience and brevity of description, the specific working processes of the systems, apparatuses, and units described above can refer to the corresponding processes in the foregoing method embodiments, and are not repeated here.

The above is only a specific implementation of the present application, but the scope of protection of the present application is not limited thereto. Any changes or replacements which can be easily thought of by those skilled in the art within the technical scope disclosed in the present application should be covered by the protection scope of the present application. Therefore, the protection scope of the present application shall be subject to the protection scope of the claims.

What is claimed is:

1. A method for transmitting a physical uplink shared channel,
   comprising:
   determining, by a terminal device, a beam for transmitting a first physical uplink shared channel (PUSCH) according to a beam used for receiving a physical downlink control channel (PDCCH); and
   transmitting, by the terminal device, the first PUSCH according to the determined beam,
   wherein the determining, by the terminal device, the beam for transmitting the first PUSCH according to the beam used for receiving the PDCCH, comprises:
   determining, by the terminal device, a spatial domain reception filter used for receiving a control resource set (CORESET) where the PDCCH is located, as the beam for transmitting the first PUSCH,
   wherein the PDCCH is not a PDCCH carrying a DCI for scheduling the first PUSCH, and wherein the PDCCH is a PDCCH satisfying a predefined latency relationship with the first PUSCH and the PDCCH is a recently received PDCCH that is k slots or k OFDM symbols before the terminal device transmits the first PUSCH, k being a non-negative integer.

2. The method according to claim 1, wherein the transmission of the first PUSCH is based on a single antenna port.

3. A terminal device, comprising:
   one or more processors; and
   memory coupled to the one or more processors and storing computer executable instructions;
   wherein the executable instructions, when executed by the one or more processors, cause the terminal device to:
   determine a beam for transmitting a first physical uplink shared channel (PUSCH) according to a beam used for receiving a physical downlink control channel (PDCCH) and
   transmit the first PUSCH according to the determined beam,
   wherein the executable instructions, when executed by the one or more processors, further cause the terminal device to:
   determine a spatial domain reception filter used for receiving a control resource set (CORESET) where the PDCCH is located, as the beam for transmitting the first PUSCH,
   wherein the PDCCH is not a PDCCH carrying a DCI for scheduling the first PUSCH, and wherein the PDCCH is a PDCCH satisfying a predefined latency relationship with the first PUSCH and the PDCCH is a recently received PDCCH which is k slots or k OFDM symbols before the terminal device transmits the first PUSCH, k being a non-negative integer.

4. The terminal device according to claim 3, wherein the transmission of the first PUSCH is based on a single antenna port.

5. A non-transitory computing storage medium storing computer executable instructions, wherein the computer executable instructions, when executed by a processor of a terminal device, cause the terminal device to perform operations including:
   determining a beam for transmitting a first physical uplink shared channel (PUSCH) according to a beam used for receiving a physical downlink control channel (PDCCH); and transmitting the first PUSCH according to the determined beam,
wherein the computer executable instructions, when executed by the processor of the terminal device, further cause the terminal device to:
determine a spatial domain reception filter used for receiving a control resource set (CORESET) where the PDCCH is located, as the beam for transmitting the first PUSCH,
wherein the PDCCH is not a PDCCH carrying a DCI for scheduling the first PUSCH, and wherein the PDCCH is a PDCCH satisfying a predefined latency relationship with the first PUSCH and the PDCCH is a recently received PDCCH which is k slots or k OFDM symbols before the terminal device transmits the first PUSCH, k being a non-negative integer.

* * * * *